US011102320B2

(12) United States Patent
Bhat et al.

(10) Patent No.: US 11,102,320 B2
(45) Date of Patent: Aug. 24, 2021

(54) POST-DELIVERY DYNAMIC CONTROL OF NOTIFICATIONS IN A PUSH NOTIFICATION LIFE-CYCLE

(71) Applicant: International Business Machines Corporation, Armonk, NY (US)

(72) Inventors: Badekila Ganesh Prashanth Bhat, Bangalore (IN); Mohan Pattadai, Bangalore (IN); Sachin Maneshwar Nayak, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/559,194

(22) Filed: Sep. 3, 2019

(65) Prior Publication Data

US 2021/0067598 A1 Mar. 4, 2021

(51) Int. Cl.
*H04L 29/08* (2006.01)
*G06Q 30/06* (2012.01)
*H04L 12/58* (2006.01)

(52) U.S. Cl.
CPC ......... *H04L 67/26* (2013.01); *G06Q 30/0601* (2013.01); *H04L 51/066* (2013.01); *H04L 51/18* (2013.01)

(58) Field of Classification Search
CPC ....... H04L 67/26; H04L 67/303; H04L 51/18; H04L 51/20; H04L 51/24; H04L 51/066; G06Q 30/0601; G06Q 30/0251; G06Q 30/0253; G06Q 30/0261; G06Q 30/0267; G06Q 30/0271
See application file for complete search history.

(56) References Cited

U.S. PATENT DOCUMENTS

| | | | | |
|---|---|---|---|---|
| 6,654,786 | B1* | 11/2003 | Fox | H04L 29/06 709/203 |
| 8,331,912 | B1* | 12/2012 | Lundy | H04L 67/1095 455/414.1 |
| 9,514,467 | B2 | 12/2016 | De et al. | |
| 9,946,782 | B2* | 4/2018 | Davis | G06Q 30/02 |
| 10,027,792 | B1* | 7/2018 | Sweeney | H04M 1/72424 |
| 10,200,487 | B2 | 2/2019 | Arabo et al. | |
| 10,664,330 | B1* | 5/2020 | Contreras | G06F 9/542 |
| 2004/0111477 | A1* | 6/2004 | Boss | H04W 4/029 709/206 |
| 2007/0239884 | A1* | 10/2007 | Karmakar | H04L 67/26 709/232 |
| 2011/0102172 | A1* | 5/2011 | Chiu | H04M 1/72448 340/539.11 |

(Continued)

*Primary Examiner* — Aaron N Strange
(74) *Attorney, Agent, or Firm* — Yee & Associates, P.C.

(57) ABSTRACT

A computer-implemented method for dynamically controlling push notifications post-delivery is provided. The method includes obtaining, by a server computer, a push notification and rules associated with the push notification. The rules specify a notification strategy to be implemented by a client device in presenting the push notification. The method also includes encoding, by the server computer, the rules in metadata. The method also includes transmitting, by the server computer, the push notification and the metadata to the client device, wherein the client device is configured to present the push notification according to the rules encoded in the metadata.

12 Claims, 8 Drawing Sheets

(56) References Cited

U.S. PATENT DOCUMENTS

| | | | | |
|---|---|---|---|---|
| 2012/0060105 | A1* | 3/2012 | Brown | H04L 51/24 |
| | | | | 715/753 |
| 2013/0346205 | A1* | 12/2013 | Hogg | G06Q 30/0261 |
| | | | | 705/14.58 |
| 2013/0346521 | A1* | 12/2013 | Arabo | H04L 29/08693 |
| | | | | 709/206 |
| 2014/0172973 | A1* | 6/2014 | Zadorozny | G06Q 30/0267 |
| | | | | 709/204 |
| 2014/0279014 | A1* | 9/2014 | Roka | G06Q 30/0261 |
| | | | | 705/14.58 |
| 2015/0082212 | A1* | 3/2015 | Sharda | H04L 67/26 |
| | | | | 715/764 |
| 2016/0034961 | A1* | 2/2016 | May | G06Q 30/0261 |
| | | | | 705/14.58 |
| 2016/0125467 | A1* | 5/2016 | Scott | H04W 4/029 |
| | | | | 705/14.58 |
| 2016/0219125 | A1* | 7/2016 | Xiao | H04L 67/28 |
| 2016/0234563 | A1* | 8/2016 | Sirpal | G06F 3/017 |
| 2016/0316450 | A1* | 10/2016 | Behrens | H04L 67/26 |
| 2017/0003832 | A1 | 1/2017 | Woley et al. | |
| 2017/0134516 | A1* | 5/2017 | Gutman | H04W 4/21 |
| 2017/0346914 | A1* | 11/2017 | Cheung | H04L 67/306 |
| 2019/0065777 | A1* | 2/2019 | Ravuvari | H04W 12/02 |
| 2019/0075178 | A1 | 3/2019 | Onnen et al. | |
| 2019/0104382 | A1* | 4/2019 | Laika | H04L 51/20 |
| 2019/0342413 | A1* | 11/2019 | Klein | H04L 65/1016 |
| 2020/0045004 | A1* | 2/2020 | Fried | H04L 12/1859 |
| 2020/0167829 | A1* | 5/2020 | Teckenburg | G06Q 30/0277 |
| 2020/0259946 | A1* | 8/2020 | Mao | G06F 3/0488 |
| 2020/0396328 | A1* | 12/2020 | Salminen | G06F 9/542 |
| 2020/0410548 | A1* | 12/2020 | Lombas | G06Q 30/0273 |

* cited by examiner

POST-DELIVERY DYNAMIC CONTROL OF NOTIFICATIONS IN A PUSH NOTIFICATION LIFE-CYCLE

BACKGROUND

1. Field

The disclosure relates generally to computer systems and, more particularly, to methods and systems for dynamic control of push notifications.

2. Description of the Related Art

Push notifications are an integral part of mobile applications; It is also being used as an asynchronous way of notifying users on the web (browsers) as well. These notifications provide a vital business value of keeping users engaged with their particular application (or website) even when they do not have it actively. Each mobile platform handles push notifications in its own way. Push notifications are meant to be asynchronous in nature. Applications using push notifications typically use a fire-and-forget method of sending their notification requests and the list of all registered devices to the end services. These services in turn handle the requests, but without promising any deadline. A method and system that provides greater control over delivery of the push notifications is desirable.

SUMMARY

According to one illustrative embodiment, a computer-implemented method for dynamically controlling push notifications post-delivery includes obtaining, by a server computer, a push notification and rules associated with the push notification. The rules specify a notification strategy to be implemented by a client device in presenting the push notification. The method also includes encoding, by the server computer, the rules in metadata. The method also includes transmitting, by the server computer, the push notification and the metadata to the client device, wherein the client device is configured to present the push notification according to the rules encoded in the metadata. According to other illustrative embodiments, a data processing system and computer program product for dynamically controlling push notifications post-delivery are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more considerations. For example, the illustrative embodiments recognize and take into account that from a business/application perspective, their requirements are not really about how fast or how long the push services take to process push requests, but instead their push notification requirements are about reaching the end user application in a timely manner and hopefully in time to be seen by the users before its relevance of the push notification is lost.

To illustrate problems with push notifications that are recognized by this disclosure, consider the following example. For example, applications such as e-Commerce apps, often rollout offers which have a deadline. Such as, for example, an offer ending at exactly 12 pm. Similarly, a financial/banking application (app) may notify a user about a deadline for payment with a 12 am deadline at the end of the month. In each case, the following problems are seen. Even if the notification has reached the mobile device, but has not been seen by the user, then it does not make sense to keep the notification on the device after the deadline (12 PM in the first example and 12 am at the end of the month in the second example). There are many situations where multiple notifications are applicable in parallel (multiple offers, etc.). The illustrative embodiments recognize and take into account that there is a need to rank push notification requests so that a higher priority notification is shown ahead of other requests. Furthermore, the illustrative embodiments recognize and take into account that there may be cases where a new push notification needs to supersede an old notification. Additionally, the illustrative embodiments recognize and take into account that there may be situations in which a notification is meaningful only at a specific time. Although there are ways to schedule push notifications (Push notification service providers), it is only available as a control on some push notification 'servers' or 'service providers'. The illustrative embodiments recognize and take into account that there is no way in the prior art to pre-send notifications to a client app and trigger the notifications at a predetermined instant.

Disclosed herein are methods, systems, and devices to solve these and other problems with the delivery of push notifications on both the server and client sides. The disclosure leverages the infrastructure used by push notifications, the push notification gateways, to send instructions and metadata in addition to the push notification content(body). The meta data is formulated in such a way as to allow the requisite post-delivery actions on the same push notification. The instructions and metadata described further in this disclosure provide the advantage of enabling the client application/receiving device to dynamically decide on presentation of the push notification. In an illustrative embodiment, the application running the client device that receives the push notification may decide to just display the notification while temporarily storing the instructions and meta-data. In other illustrative embodiment, it may schedule the display of the notification as per the instruction present in the meta-data. Alternatively, the instruction indicates a display of the notification only if it is delivered within a predefined deadline. In other illustrative embodiments, the disclosed systems dynamically delete the notification on the occurrence of an event/deadline. Illustrative embodiment provide methods to enable overriding priorities for notifications, so that if there is an urgent notification to be delivered, then the urgent notifications are prioritized over other notifications in the order of display, such that the urgent notification will be displayed first.

Illustrative embodiments provide that in order to prevent possible delays on the processing of push notifications on the server side, methods are employed such that the notifications are sent ahead in time and are pre-configured to trigger notification at a specific time. Similarly, if for some reason, a notification has reached the client device, but the user has not been able to view it, illustrative embodiments enable a self-expiry or deletion of the notifications automatically. In general, illustrative embodiments of this disclosure allow a user to dynamically define post-delivery behavior of notifications in a push notification life-cycle.

Illustrative embodiments provide a push notification service and push notification server that manages push notifications. A user of this server (push notification administrator) usually has published mobile applications. This user decides on what notifications to send to end user's devices who have the installed application. Illustrative embodiments also provide a push notification client and push notification client devices that receive push notifications from a push notification gateway. The device will typically have the application installed that is used by a push notification provider. Illustrative embodiments also provide a push notification gateway, some of which may be platform specific gateways used by particular client device hardware (e.g., smartphones) providers. Push notification gateways manage sending push notifications. Platform specific gateways manage sending push notifications to their respective platforms.

Illustrative embodiments solve these problems described above by methods on the push notifications service side as well as the client side. Illustrative embodiments leverage the infrastructure used by push notifications, the push notification gateways to send instructions and metadata in addition to the push notification content(body). The meta data is formulated in such a way as to allow the requisite post-delivery actions on the same push notification. The instructions and metadata described further in this disclosure will enable the client application/receiving device to dynamically decide on presentation of the push notification. The application running the client device that receives the push notification may decide to just display the notification while temporarily storing the instructions and metadata. Or else, it may schedule the display of the notification as per the instruction present in the meta-data. Alternatively, the instruction could indicate a display of the notification only if it is delivered within a predefined deadline. Or to dynamically delete the notification on the occurrence of an event/deadline.

Disclosed herein are methods and systems to enable overriding priorities for notifications, so that if there is an urgent notification to be delivered, then they are prioritized over other notifications in the order of display. In illustrative embodiments, in order to prevent possible delays on the processing of Firebase Cloud Messaging or Apple Push Notification service (FCM/APNS) side, methods are employed such that the notifications are send ahead in time and are pre-configured to trigger notification at a specific time. Similarly, if for some reason, a notification has reached the client device, but the user has not been able to view it, illustrative embodiments enable a self-expiry or deletion of the notifications automatically. In general, illustrative embodiments allow an enterprise user to dynamically define post-delivery behavior of notifications in a push notification life-cycle.

Figure 1:
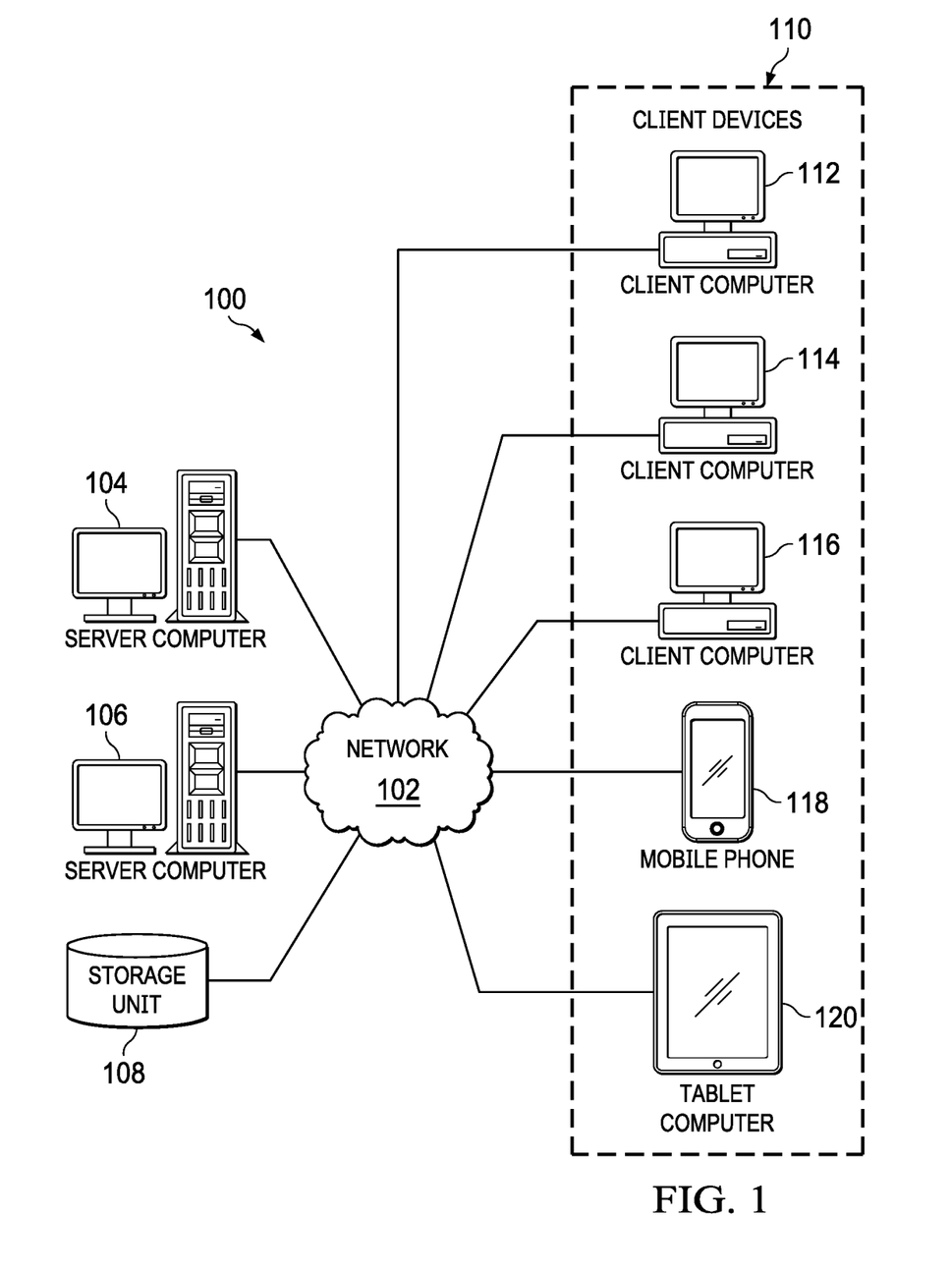
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, and tablet computer 120. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
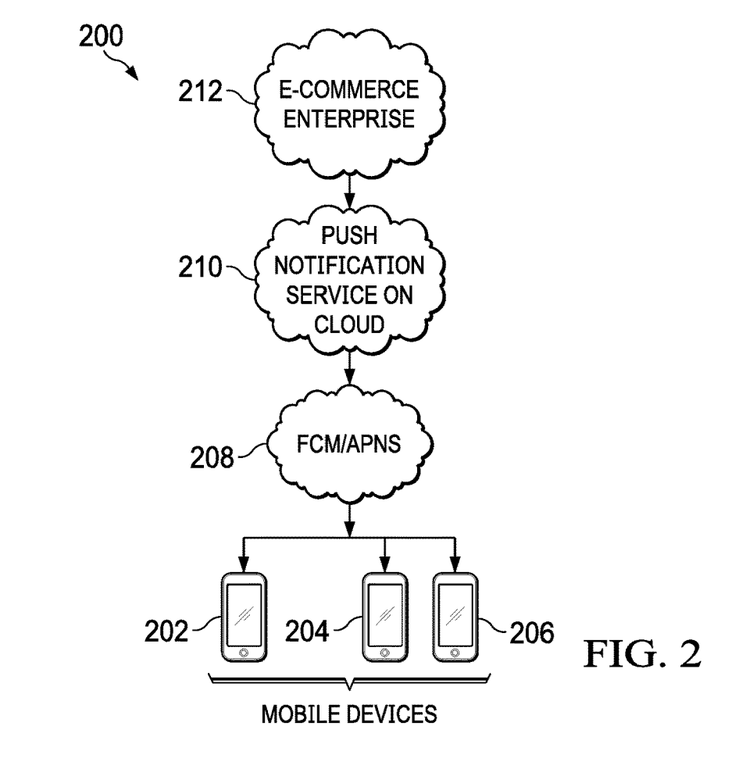
FIG. 2 is a block diagram of a system for dynamically managing push notification on a client depicted in accordance with an illustrative embodiment.

Turning now to FIG. 2, a block diagram of a system for dynamically managing push notification on a client is depicted in accordance with an illustrative embodiment. System 200 includes a number of mobile devices 202, 204, 206 that are connected to a Firebase Cloud Messaging or Apple Push Notification service (FCM/APNS) server 208 to receive push notifications. FCM/APNS server 208 is a platform specific server that sends push notifications to certain types of client device platforms (i.e., mobile devices 202, 204, 206). FCM/APNS server 208 is an example of a platform specific push notification processing server. One type of mobile device 202, 204, 206 (e.g., a smart phone produced by company A) receives push notifications from a certain type of FCM/APNS server 208 that is specific for that type of device while a second type of mobile device 202, 204, 206 (e.g., a smart phone produced by company B) receives push notifications from a different type of FCM/APNS server 208 such that each mobile device 202, 204, 206 receives push notifications that are formatted in a manner suitable for use by the corresponding mobile device 202, 204, 206. System 200 also includes a push notification service on a cloud server 210 and an E-Commerce Enterprise server 212. Mobile devices 202, 204, 206 may be implemented as, for example, any of client devices 110 in FIG. 1. FCM/APNS server 208, push notification service on a cloud server 210, and E-Commerce Enterprise server 212 may be implemented as, for example, one of servers 104, 106 in FIG. 1.

Push notification service on a cloud server 210 provides push notifications with embedded metadata to the FCM/APNS server 208 for delivery to the appropriate mobile device 202, 204, 206. The push notification service on a cloud server 210 provides push notifications that have dynamically executed instructions encoded in metadata that are encapsulated with the push notification that are either formatted for the particular platform specific FCM/APNS server 208 or that are platform independent. E-Commerce Enterprise server 212 provides push notifications with desired rues to push notification service on a cloud server 210. Push notification service on a cloud server 210 embeds the appropriate rules in metadata that are encapsulated with the push notification such that it appears to be a single push notification. The push notification service on a cloud server 210 then sends the push notification with the embedded metadata to the FCM/APNS server 208 which then pushes the push notification to the appropriate mobile device 202, 204, 206.

Upon receiving the push notification, the mobile device 202, 204, 206 looks to see if the push notification includes instructions or metadata and, if it does, the mobile device 202, 204, 206 processes the push notification and presents the push notification to the user according to the rules embedded in the metadata. The metadata may include rules that specify a rank order that indicate a priority of a push notification indicating which order that a push notification is to be presented to the user regardless of when the push notification was actually received. The metadata may also include rules that indicate that a previously received push notification is superseded and, if the superseded push notification has not already been presented to the user, then the superseded push notification is to be deleted and the new superseding push notification is to be presented to the user instead. The metadata may also include rules that specify a time trigger or other triggering event that indicate when the push notification is to be presented to the user.

Thus, a push notification can be pushed to the mobile device 202, 204, 206 at a time earlier than when it is desired that the push notification be presented to the user and the push notification will sit on the mobile device 202, 204, 206 and not be presented to the user until the condition specified by the trigger is met. The trigger may be an expiry time, but, in other illustrative embodiments, may be some other type of event, such as the user opening a specified application or performing some other action not necessarily dependent upon a certain time. In some illustrative embodiments, the metadata for a single push notification may include multiple instructions. For example, the metadata for a single push notification may include a ranking, a superseding instruction, and a trigger.

Figure 3:
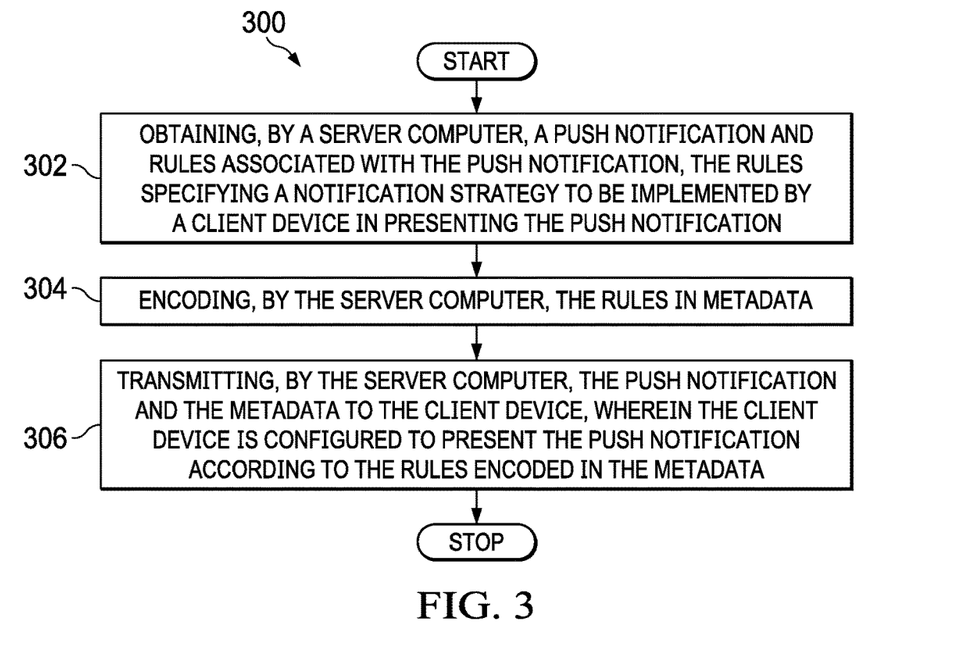
FIG. 3 is a flowchart of a process for dynamically managing push notifications on a client depicted in accordance with an illustrative embodiment.

Turning now to FIG. 3, a flowchart of a process for dynamically managing push notifications on a client is depicted in accordance with an illustrative embodiment. Process 300 may be implemented on, for example, push notification service on cloud server 210 in FIG. 2. Process 300 begins by obtaining, by a server computer, a push notification and rules associated with the push notification, the rules specifying a notification strategy to be implemented by a client device in presenting the push notification (step 302). The notification strategy may specify such things as timing of presenting the push notifications, order of presenting push notifications, replacement of prior push notifications with new push notifications, an expiry time after expiration of which the client device refrains from presenting a push notification due to, for example, the information contained within the push notification no longer being relevant, etc. Process 300 continues by encoding, by the server computer, the rules in metadata (step 304). Process continues by transmitting, by the server computer, the push notification and the metadata to the client device, wherein the client device is configured to present the push notification according to the rules encoded in the metadata (step 306).

In an illustrative embodiment, the rules specify a trigger time for the push notification, and wherein the rules cause the client device to present the push notification to a user after the trigger time specified in the rules. In an illustrative embodiment, the rules specify a ranking of the push notification, and wherein the rules cause the client device to present the push notification in an order according to the rank of the push notification when the client device includes multiple push notifications to present to a user. In an illustrative embodiment, the rank causes the client device to present a later acquired push notification before presenting an earlier acquired push notification.

In an illustrative embodiment, the rules cause the client device to replace a pre-sent push notification with a new notification. In an illustrative embodiment, transmitting the push notification and the metadata to the client device comprises transmitting the push notification and the metadata to a vendor specific messaging server in a vendor specific format, wherein the vendor specific messaging server is configured to forward the push notification and the metadata to the client device. In an illustrative embodiment, obtaining, by the server computer, the push notification and the rules associated with the push notification comprise obtaining, by the server computer, the push notification and the rules associated with the push notification from an e-commerce entity.

Figure 4:
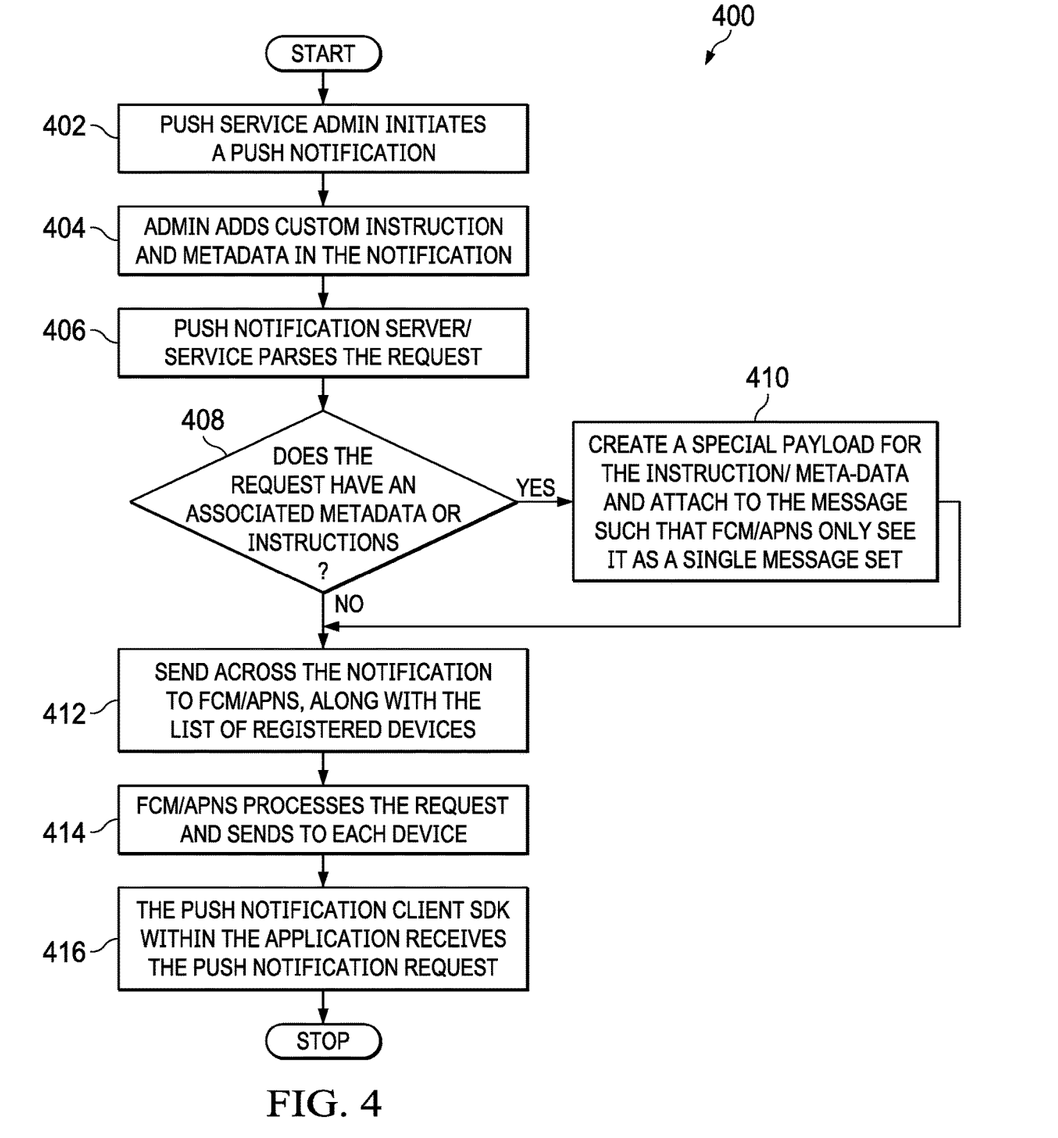
FIG. 4 is a flowchart of a process for dynamically creating and transmitting push notifications with dynamically managed content depicted in accordance with an illustrative embodiment.

Turning now to FIG. 4, a flowchart of a process for dynamically creating and transmitting push notifications with dynamically managed content is depicted in accordance with an illustrative embodiment. Process 400 begins by a push service administrator, such as, for example, a push service administrator implemented in push notification service on cloud server 210 in FIG. 2, initiating a push notification (step 402). Next, the administrator adds custom instructions and metadata to the notification (step 404). The push notification server/services then parses the request (step 406) and determines whether the request has an associated meta data or instructions (step 408). If the request has an associated meta data or instructions, then the process 400 proceeds to step 410 where a special payload for the instruction/meta-data is created and attached to the message such that the FCM/APNS only sees it as a single message set. If, at step 408, the request does not have an associated meta data, or after completion of step 410 if the request does have an associated meta data, the process 400 proceeds to step 412 where the notification is sent to the FCM/APNS along with the list of registered devices. Next, the FCM/APNS processes the request and sends the notification to each device (step 414). Next, the push notification client SDK within the application receives the push notification request (step 416) after which, the process 400 may end.

Figure 5:
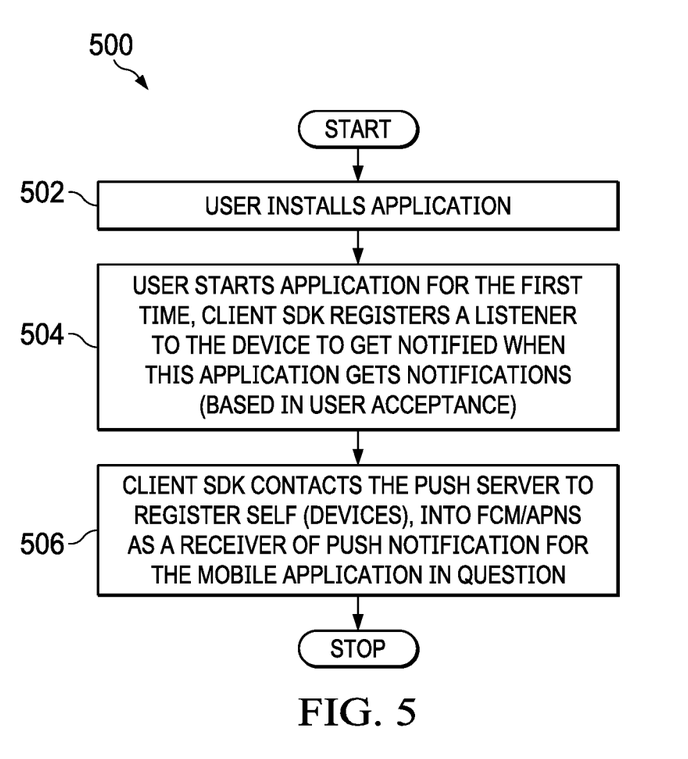
FIG. 5 is a flowchart of a process on a client device for dynamically registering to receive push notifications depicted in accordance with an illustrative embodiment.

Turning now to FIG. 5, a flowchart of a process on a client device for dynamically registering to receive push notifications is depicted in accordance with an illustrative embodiment. Process 500 begins with the user installing an application (step 502). Next, the user starts the application for the first time and the client SDK registers a listener to the device to get notified when the application receives notifications (based in user acceptance) (step 504). Next, the client SDK contacts the push server to register itself (devices) into FCM/APNS as a receiver of push notifications for the mobile application in question (step 506), after which, the process 500 may end.

Figure 6:
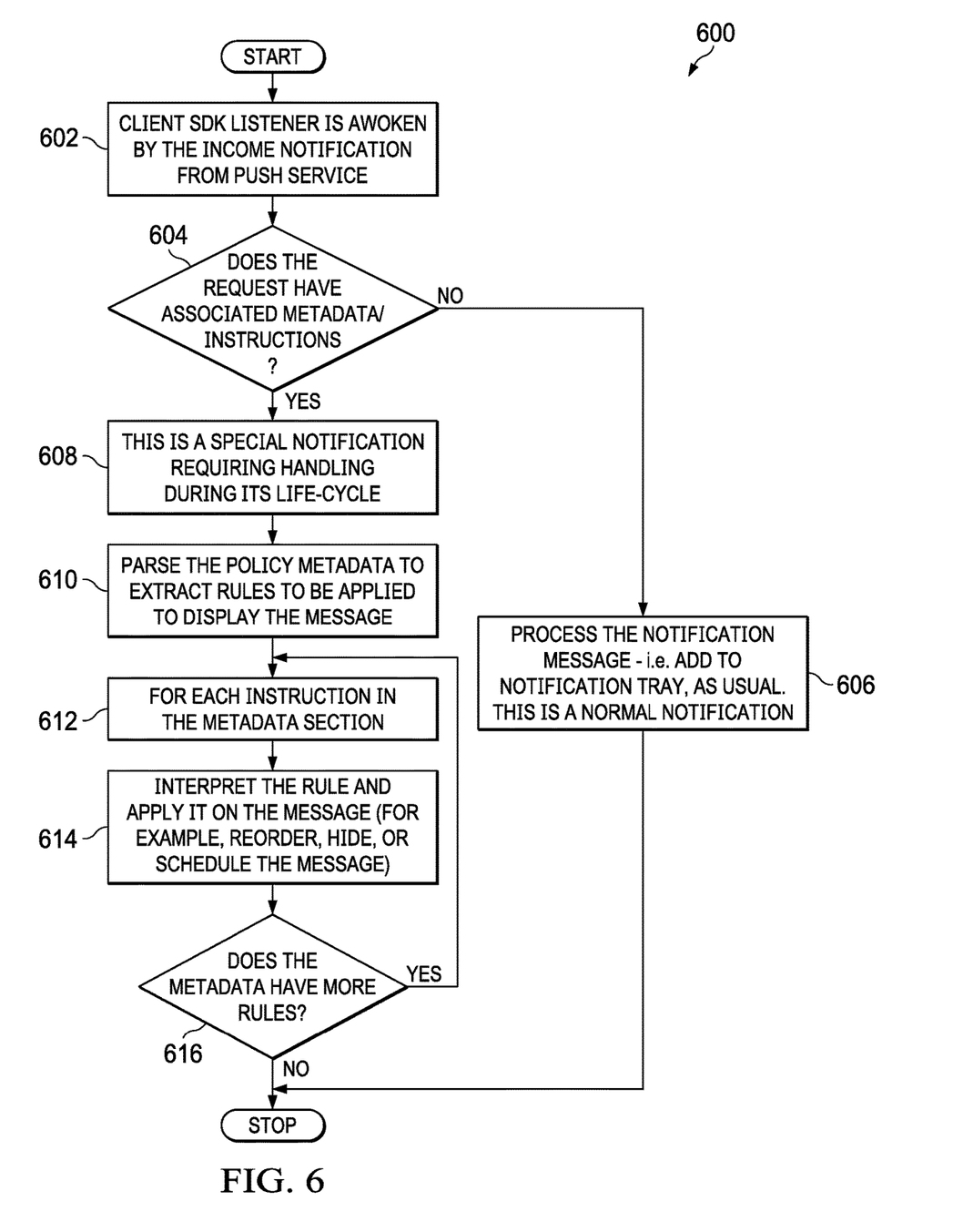
FIG. 6 is a flowchart of a process on a user device for receiving and presenting a push notification depicted in accordance with an illustrative embodiment.

Turning now to FIG. 6, a flowchart of a process on a user device for receiving and presenting a push notification is depicted in accordance with an illustrative embodiment. The process 600 begins with the client SDK listener being awoken by an incoming notification from the push service (step 602). Next, the client SDK listener determines whether the request has any associated metadata or instructions (step 604).

If the request does not have any associated metadata or instructions, then the process 600 proceeds to process the notification message (i.e., add the request to the notification tray as usual per a normal notification) (step 606), after which, the process 600 may end. If, at step 604, the request does have associated metadata or instructions, then the request is a special notification requiring handling during its lifetime (step 608). Next, the policy metadata is parsed to extract rules to be applied to display the message (step 610).

Next, for each instruction in the metadata section (step 612), the process 600 interprets the rule and applies it on the message (for example, reorder, hide, or schedule the message) (step 614). In an illustrative embodiment, the rules specify an expiry time of the notification and cause the client device to refrain from presenting the push notification after the expiration of the expiry time. In an illustrative embodiment, the rules specify a trigger time for the push notification and cause the client device to present the push notification to a user after the trigger time specified in the rules. In an illustrative embodiment, the rules specify a ranking of the push notification, and wherein the rules cause the client device to present the push notification in an order according to the rank of the push notification when the client device includes multiple push notifications to present to a user.

In an illustrative embodiment, the rank causes the client device to present a later acquired push notification before presenting an earlier acquired push notification. In an illustrative embodiment, the rules cause the client device to replace a pre-sent push notification with a new notification. In an illustrative embodiment, transmitting the push notification and the metadata to the client device comprises transmitting the push notification and the metadata to a vendor specific messaging server in a vendor specific format, wherein the vendor specific messaging server is configured to forward the push notification and the metadata to the client device. In an illustrative embodiment, obtaining, by the server computer, the push notification and the rules associated with the push notification comprise obtaining, by the server computer, the push notification and the rules associated with the push notification from an e-commerce entity. At step 616, the process 600 determines whether the metadata has more rules and, if yes, the process 600 proceeds to step 612, otherwise, if no, then the process 600 may end.

Figure 7A:
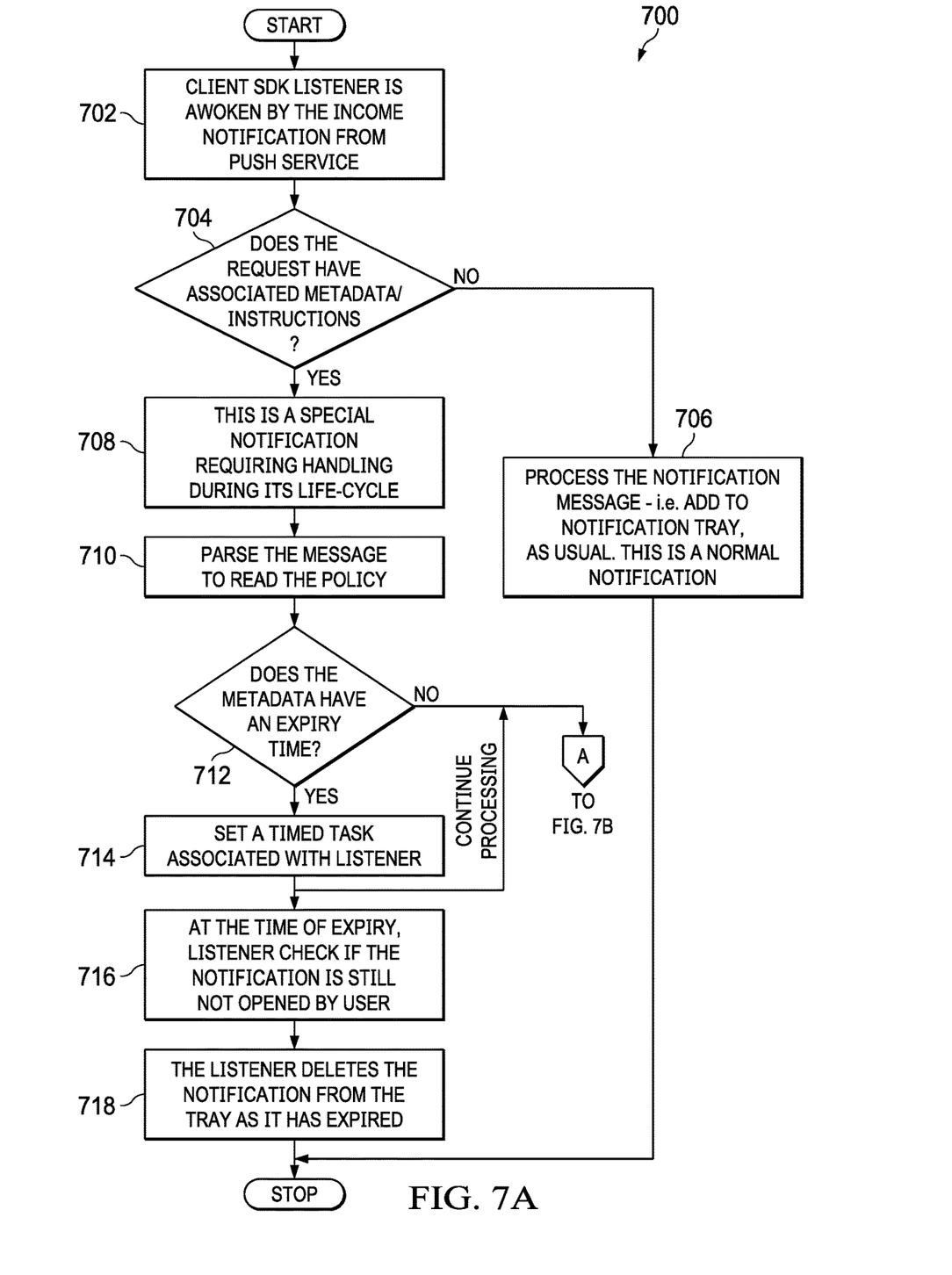
FIGS. 7A-7B show a flowchart of a process on a user device for dynamically presenting a notification depicted in accordance with an illustrative embodiment.
Figure 7B:
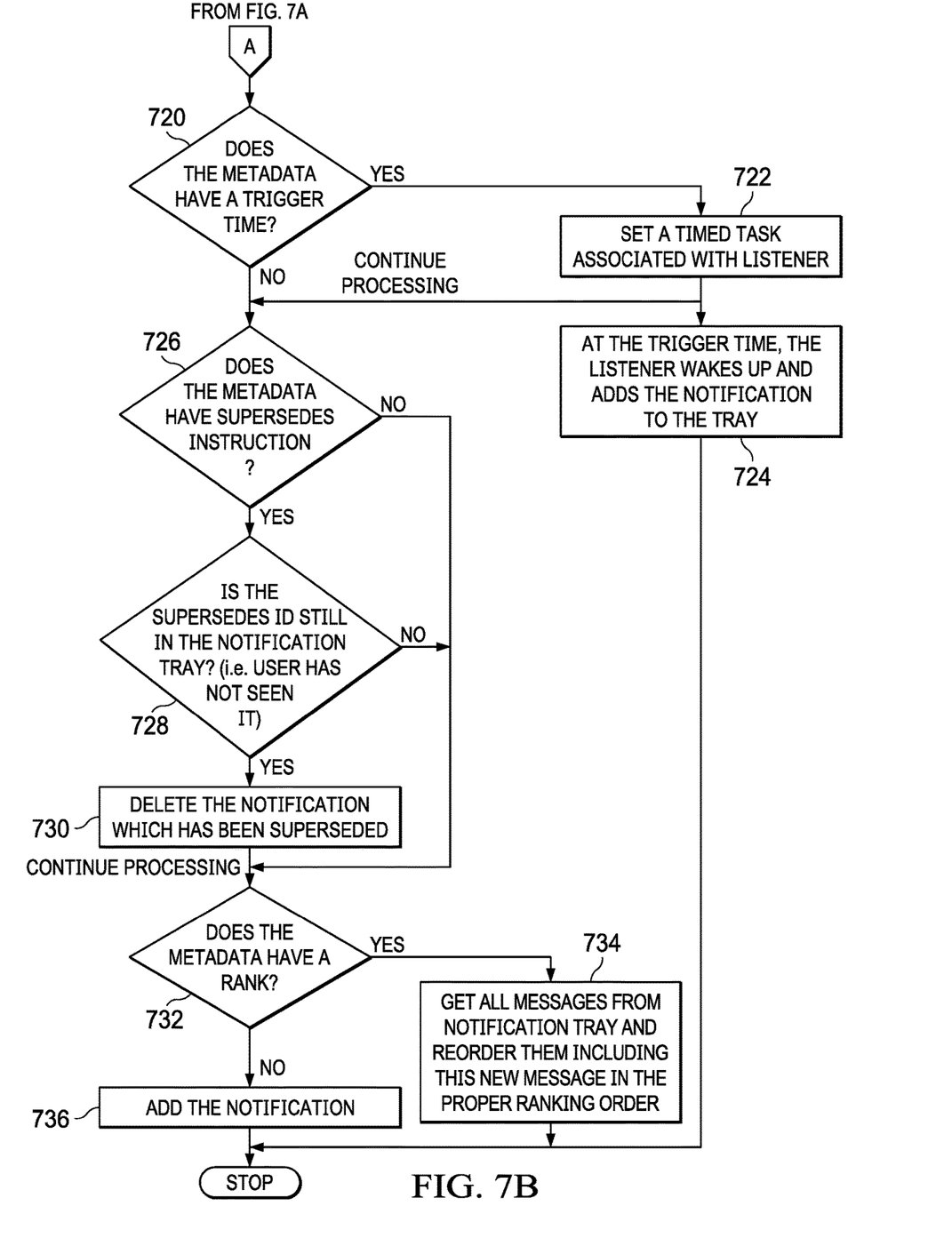

Turning now to FIGS. 7A-7B, a flowchart of a process on a user device for dynamically presenting a notification is depicted in accordance with an illustrative embodiment. Process 700 begins by awakening the client SDK listener by an incoming notification from a push service (step 702). Next, the client SDK listener determines whether the request has associated metadata or instructions (step 704). If no, then the process 700 proceeds to process the notification message as usual (i.e., add the request to the notification tray as usual and notify the user in a normal notification) (step 706) after which, process 700 may end.

If, at step 706, the request does have associated metadata and/or instructions, then the process 700 then identifies that the request is a special notification requiring handling during its life cycle (step 708) and parses the message to read the policy (step 710). The process 700 then determines whether the metadata has an expiry time (step 712). If yes, then the process 700 sets a timed task associated with the listener (step 714) and continues processing proceeding to step 720. However, additionally, at the time of expiry, the listener checks if the notification is still not opened by the user (step 716) and the listener deletes the notification from the tray as it has expired (step 718), after which, the process 700 may end.

If, at step 712, the metadata does not have an expiry time or after the timed task associated with the listener has been set (step 714), then the process 700 proceeds to determine whether the metadata has a trigger time (step 720). A trigger time is the time after which the push notification is to be presented to the user. Thus, by using a push notification with a trigger time, the push notification can be provided to the user device in advance and then later presented to the user. If the metadata has a trigger time, then the process 700 proceeds to set a timed task associated with the listener (step 722) and continues processing. At the trigger time, the listener wakes up and adds the notification to the tray (step 724), after which, the process may end 700.

If the metadata does not have a trigger time (step 712) or after the timed task associated with the listener is set (step 714), the process 700 proceeds to determine if the metadata have superseding instructions (step 726). Superseding instructions are instructions that a push notification supersedes or replaces a previous push notification such that the superseding push notification is presented to the user rather than the prior superseded push notification. If, at step 726, the metadata has superseding instructions, then the process 700 proceeds to determine if the supersedes ID (i.e., the identifier of the push notification for which the new push notification supersedes) is still in the notification tray (i.e., the user has not yet seen the superseded push notification) (step 728). If the superseded push notification is still in the notification tray, then the process 700 proceed to delete the superseded push notification from the notification tray (step 730) after which, the process 700 continues to step 732. If, at step 728, the superseded ID is not still in the notification tray (i.e., the user has already seen it), the process 700 continues to step 732.

If, at step 726, the metadata does not have supersedes instructions, then the process 700 continues to determine if the metadata has a rank (step 732). A rank in the metadata would indicate a priority of the push notification indicating which, in a plurality of push notifications have precedence in being presented to the user. For example, in an embodiment, a higher ranked push notification is presented to the user before a lower ranked push notification even if the lower ranked push notification was received by the user device prior to the higher ranked push notification. If, at step 732, the metadata includes a rank, then the process 700 proceeds to get all messages from the notification tray and reorder them including this new message into a proper order based on the ranking order of each push notification (step 734). The push notifications will then be presented to the user in the order prescribed by the rank order. If, at step 732, the metadata does not have a rank, then the process 700 proceeds to add the notification to the notification tray (step 736) to be presented to the user at an appropriate time, after which, the process 700 may end.

Figure 8:
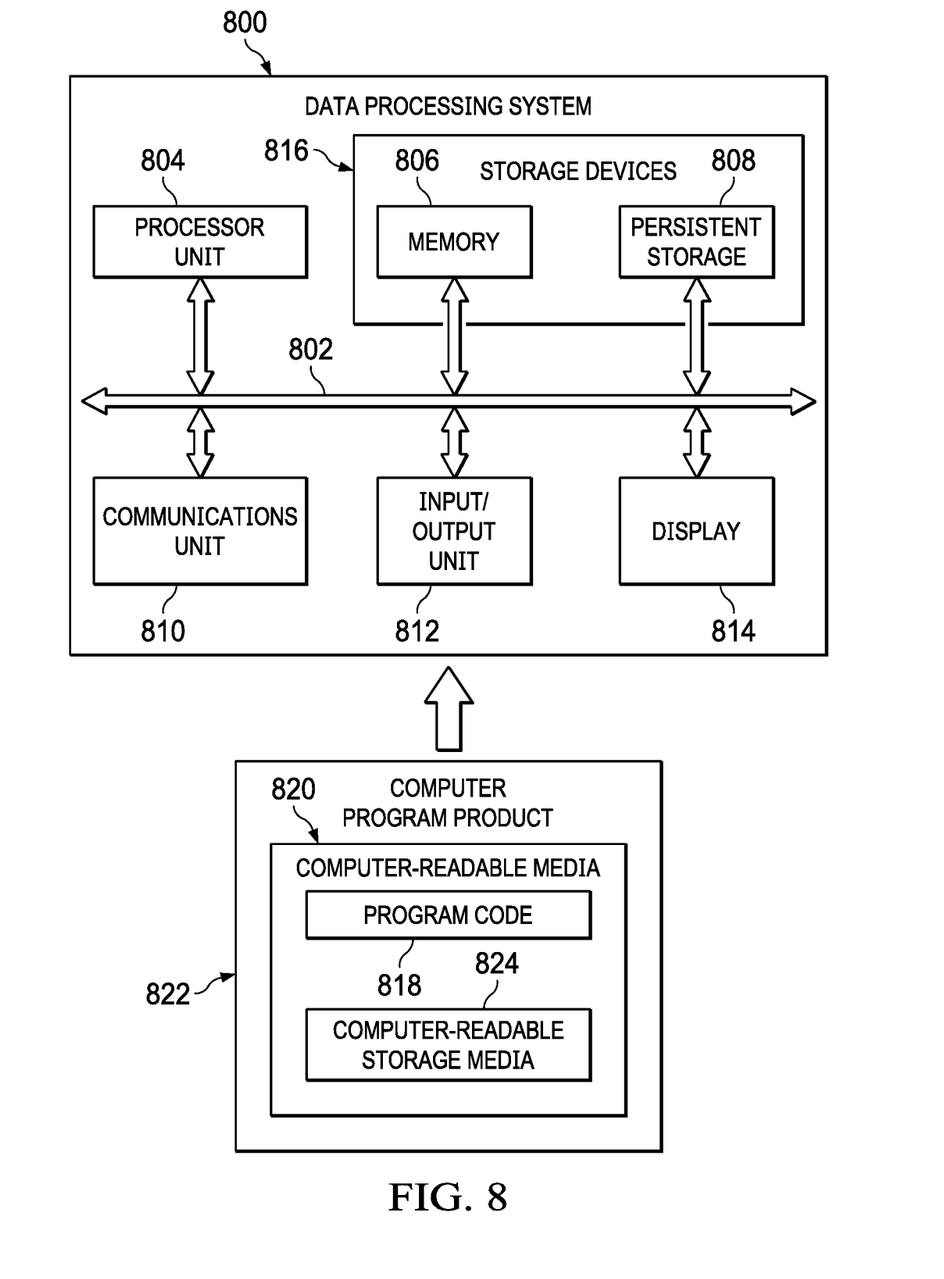
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, and/or one or more of client devices 110, in FIG. 1. Data processing system 800 can also be used to implement one or more of mobile devices 202, 204, 206, FCM/APNS server 208, push notification service on cloud server 210, and E-Commerce Enterprise server 212 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Thus, illustrative embodiments of the present invention provide a computer implemented method, computer system, and computer program product for generating lyrics for poetic compositions. The method determines a theme randomly or from input and, from the theme, the method determines words that are associated with the theme and words that rhyme with the associated words according to a star schema approach. The method provides a filter and other mechanisms to tailor the output to fit a specified sentiment, topic, or other feature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for dynamically controlling push notifications post-delivery, comprising:
    obtaining, from an e-commerce entity by a server computer, a push notification and rules associated with the push notification, the rules specifying a notification strategy to be implemented by a client device in presenting the push notification;
    encoding, by the server computer, the rules in metadata; and
    transmitting, by the server computer, the push notification and the metadata to the client device via an intermediary vendor specific messaging server in a vendor specific format, wherein the vendor specific messaging server is configured to forward the push notification and the metadata to the client device, wherein the client device is configured to present the push notification according to the rules encoded in the metadata, wherein the rules specify an interaction performed by a user with the client device that triggers the push notification to be presented to the user of the client device, and wherein the rules obtained from the e-commerce entity by the server computer that are encoded in the metadata transmitted to the client device include (i) a supersede instruction that instructs the client device to delete a pre-sent push notification from a system tray of the client device if the pre-sent push notification has not already been presented to a user of the client device, and (ii) a trigger time that indicates to the client device when to place the push notification in the system tray of the client device.

2. The computer-implemented method of claim 1, wherein the rules specify an expiry time of the push notification, and a ranking of the push notification, wherein the rules cause the client device to refrain from presenting the push notification after the expiration of the expiry time, and cause the client device to present the push notification in an order according to the rank of the push notification when the client device includes multiple push notifications to present to the user.

3. The computer-implemented method of claim 2, wherein the rank causes the client device to present a later acquired push notification before presenting an earlier acquired push notification.

4. The computer-implemented method of claim 1, wherein the intermediary vendor specific messaging server is a plurality of intermediary vender specific messaging servers, and wherein the transmitting comprises:
    transmitting, by the server, the push notification and the metadata to the client device via a selected one of the plurality of intermediary vender specific messaging servers that is selected based on a type of the client device.

5. A computer system for dynamically controlling push notifications post-delivery, the computer system comprising:
    a bus system;
    a storage device connected to the bus system, wherein the storage device stores program instructions; and
    a processor connected to the bus system, wherein the processor executes the program instructions to:
    obtain from an e-commerce entity a push notification and rules associated with the push notification, the rules specifying a notification strategy to be implemented by a client device in presenting the push notification;
    encode the rules in metadata; and
    transmit the push notification and the metadata to the client device via an intermediary vendor specific messaging server in a vendor specific format, wherein the vendor specific messaging server is configured to forward the push notification and the metadata to the client device, wherein the client device is configured to present the push notification according to the rules encoded in the metadata, wherein the rules specify an interaction performed by a user with the client device that triggers the push notification to be presented to the user of the client device, and wherein the rules obtained from the e-commerce entity by the server computer that are encoded in the metadata transmitted to the client device include (i) a supersede instruction that instructs the client device to delete a pre-sent push notification from a system tray of the client device if the pre-sent push notification has not already been presented to a user of the client device, and (ii) a trigger time that indicates to the client device when to place the push notification in the system tray of the client device.

6. The computer system of claim 5, wherein the rules specify an expiry time of the push notification, and a ranking of the push notification, wherein the rules cause the client device to refrain from presenting the push notification after the expiration of the expiry time, and cause the client device to present the push notification in an order according to the rank of the push notification when the client device includes multiple push notifications to present to the user.

7. The computer system of claim 6, wherein the rank causes the client device to present a later acquired push notification before presenting an earlier acquired push notification.

8. The computer system of claim 5, wherein the intermediary vendor specific messaging server is a plurality of intermediary vender specific messaging servers, and wherein the transmit comprises:
  transmit the push notification and the metadata to the client device via a selected one of the plurality of intermediary vender specific messaging servers that is selected based on a type of the client device.

9. A computer program product for dynamically controlling push notifications post-delivery, the computer program product comprising a computer readable storage medium having program instructions embodied therewith, the program instructions executable by a computer to cause the computer to perform a method comprising:
  obtaining, from an e-commerce entity by a server computer, a push notification and rules associated with the push notification, the rules specifying a notification strategy to be implemented by a client device in presenting the push notification;
  encoding, by the server computer, the rules in metadata; and
  transmitting, by the server computer, the push notification and the metadata to the client device via an intermediary vendor specific messaging server in a vendor specific format, wherein the vendor specific messaging server is configured to forward the push notification and the metadata to the client device, wherein the client device is configured to present the push notification according to the rules encoded in the metadata, wherein the rules specify an interaction performed by a user with the client device that triggers the push notification to be presented to the user of the client device, and wherein the rules obtained from the e-commerce entity by the server computer that are encoded in the metadata transmitted to the client device include (i) a supersede instruction that instructs the client device to delete a pre-sent push notification from a system tray of the client device if the pre-sent push notification has not already been presented to a user of the client device, and (ii) a trigger time that indicates to the client device when to place the push notification in the system tray of the client device.

10. The computer program product of claim 9, wherein the rules specify an expiry time of the push notification, and a ranking of the push notification, wherein the rules cause the client device to refrain from presenting the push notification after the expiration of the expiry time, and cause the client device to present the push notification in an order according to the rank of the push notification when the client device includes multiple push notifications to present to the user the rules.

11. The computer program product of claim 10, wherein the rank causes the client device to present a later acquired push notification before presenting an earlier acquired push notification.

12. The computer program product of claim 9, wherein the intermediary vendor specific messaging server is a plurality of intermediary vender specific messaging servers, and wherein the transmitting comprises:
  transmitting the push notification and the metadata to the client device via a selected one of the plurality of intermediary vender specific messaging servers that is selected based on a type of the client device.

* * * * *